United States Patent
Schaefer

(10) Patent No.: US 12,046,944 B2
(45) Date of Patent: Jul. 23, 2024

(54) METHOD AND DEVICE FOR SUPPLYING ENERGY TO AN ELECTRIC CONSUMER OF A VEHICLE

(71) Applicant: Bayerische Motoren Werke Aktiengesellschaft, Munich (DE)

(72) Inventor: Martin Schaefer, Maisach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 180 days.

(21) Appl. No.: 17/594,033

(22) PCT Filed: Apr. 1, 2020

(86) PCT No.: PCT/EP2020/059278
§ 371 (c)(1),
(2) Date: Sep. 30, 2021

(87) PCT Pub. No.: WO2020/229047
PCT Pub. Date: Nov. 19, 2020

(65) Prior Publication Data
US 2022/0166244 A1    May 26, 2022

(30) Foreign Application Priority Data
May 15, 2019 (DE) .................. 10 2019 112 706.8

(51) Int. Cl.
*H02J 9/06* (2006.01)
*B60R 16/033* (2006.01)
*H02J 7/00* (2006.01)

(52) U.S. Cl.
CPC ............ *H02J 9/06* (2013.01); *B60R 16/033* (2013.01); *H02J 7/0063* (2013.01); *H02J 7/007182* (2020.01)

(58) Field of Classification Search
CPC ...... H02J 7/0063; H02J 7/0013; H02J 7/0025; H02J 9/06; H02J 2007/0067
See application file for complete search history.

(56) References Cited

U.S. PATENT DOCUMENTS

| | | | |
|---|---|---|---|
| 2004/0124709 A1* | 7/2004 | Eisenberger | H02J 9/061 307/29 |
| 2008/0129249 A1* | 6/2008 | Ishishita | H01M 10/48 320/136 |

(Continued)

FOREIGN PATENT DOCUMENTS

| | | |
|---|---|---|
| CN | 102273047 A | 12/2011 |
| CN | 102933420 A | 2/2013 |

(Continued)

OTHER PUBLICATIONS

International Search Report (PCT/ISA/210) issued in PCT Application No. PCT/EP2020/059278 dated Apr. 1, 2020 with English translation (five (5) pages).

(Continued)

*Primary Examiner* — Adi Amrany
(74) *Attorney, Agent, or Firm* — Crowell & Moring LLP

(57) ABSTRACT

A device includes a first supply unit, which is connectable via a first switch element to a first consumer, a second supply unit, which is connectable via a second switch element and via one or more electric delimitation elements to the first consumer, and a third switch element, which is configured to bridge the one or more electric delimitation elements. A control unit is configured to cause the first switch element to close, and the second and third switch elements to open, in normal operation. The control unit is further configured to detect that a first supply voltage at the first supply unit has reached or fallen below a voltage threshold value, and in response causes first the second switch element to close, then the first switch element to open, and then the third (Continued)

switch element to close, such that the first consumer is coupled to the second supply unit.

13 Claims, 2 Drawing Sheets

(56) References Cited

U.S. PATENT DOCUMENTS

| | | | |
|---|---|---|---|
| 2008/0238194 A1 | 10/2008 | Treguer | |
| 2010/0295513 A1* | 11/2010 | McCollum | G06F 1/26 |
| | | | 320/136 |
| 2010/0327813 A1 | 12/2010 | Bucur et al. | |
| 2011/0128662 A1* | 6/2011 | Kato | B60L 3/0069 |
| | | | 361/166 |
| 2012/0035836 A1 | 2/2012 | Mueller et al. | |
| 2012/0248869 A1 | 10/2012 | Itagaki et al. | |
| 2013/0162030 A1 | 6/2013 | Sonesson et al. | |
| 2013/0214595 A1 | 8/2013 | Sierak et al. | |
| 2015/0035356 A1* | 2/2015 | Sakata | H02J 7/00306 |
| | | | 307/9.1 |
| 2015/0298568 A1* | 10/2015 | Mitsutani | B60W 10/26 |
| | | | 180/65.21 |
| 2016/0036371 A1* | 2/2016 | Yamasaki | B62D 5/046 |
| | | | 318/400.22 |
| 2016/0137076 A1* | 5/2016 | King | B60L 58/20 |
| | | | 320/108 |
| 2017/0005482 A1* | 1/2017 | Matsushita | H02J 7/0031 |
| 2017/0106758 A1 | 4/2017 | Sakatani et al. | |
| 2018/0009400 A1* | 1/2018 | Lee | B60R 16/03 |
| 2018/0056806 A1 | 3/2018 | Dulle | |
| 2018/0118038 A1 | 5/2018 | Botev et al. | |
| 2018/0123491 A1* | 5/2018 | Jo | G01R 31/382 |
| 2018/0354436 A1* | 12/2018 | Sato | H02H 7/18 |
| 2019/0229377 A1* | 7/2019 | Kim | H01M 50/204 |
| 2022/0029442 A1* | 1/2022 | Mittag | B60R 16/03 |
| 2022/0302730 A1* | 9/2022 | Sakamoto | G01K 3/08 |

FOREIGN PATENT DOCUMENTS

| | | |
|---|---|---|
| CN | 103171502 A | 6/2013 |
| CN | 108736562 A | 11/2018 |
| DE | 10 2005 004 330 A1 | 8/2006 |
| DE | 10 2014 008 516 A1 | 12/2015 |
| DE | 10 2016 221 329 A1 | 5/2018 |
| DE | 10 2017 213 409 A1 | 2/2019 |
| EP | 2 983 270 A1 | 2/2016 |
| WO | WO 2006/099984 A1 | 9/2006 |

OTHER PUBLICATIONS

German-language Written Opinion (PCT/ISA/237) issued in PCT Application No. PCT/EP2020/059278 dated Apr. 1, 2020 (10 pages).
German-language Search Report issued in German Application No. 10 2019 112 706.8 dated Mar. 13, 2020 with a partial English translation (10 pages).
Chinese-language Office Action issued in Chinese Application No. 202080031394.0 dated May 10, 2023 with English translation (21 pages).
Chinese-language Office Action issued in Chinese Application No. 202080031394.0 dated Dec. 11, 2023 with English translation (20 pages).

* cited by examiner

METHOD AND DEVICE FOR SUPPLYING ENERGY TO AN ELECTRIC CONSUMER OF A VEHICLE

BACKGROUND AND SUMMARY OF THE INVENTION

The invention relates to a method and a device for supplying an electric load of a vehicle from two separate supply units.

A vehicle comprises a plurality of electric loads, which assume various functions in the vehicle. The electric loads, at least in part, can fulfill different safety requirements, particularly including safety requirements for the respective energy supply. For example, a vehicle can comprise a specific (and, typically, relatively low) number of safety-related loads, which are generally required to fulfill a specific ASIL (Automotive Safety Integrity Level). The vehicle can further comprise a (typically, relatively high) number of non-safety-related loads which, for example, will only need to be certified and/or developed in accordance with QM (Quality Management) requirements.

Safety-related loads include e.g. systems for highly automated and/or fully automated driving (HAF or VAF) and/or x-by-wire (brake-by-wire or steer-by-wire) systems, which are controlled exclusively by way of electrical signals, and which accommodate no mechanical or hydraulic intervention in control variables. Optionally, functions of this type must be delivered with an availability which is compliant with ASIL level D (ISO 26262).

Typically, the availability requirement for the respective function translates automatically to the interfaces of that respective function, such that the same availability requirement applies, inter alia, to the energy supply for the respective systems. As individual supply units or energy sources, such as batteries, generators or DC-DC converters, are typically not capable of fulfilling this availability requirement in isolation, the supply units for a safety-related electric load are generally redundant, and are executed independently of one another, with respect to a common cause of failure.

A fault-tolerant system can be implemented by the parallel execution of two parallel-routed process chains or subsystems, each comprised of a control device, sensors and actuators. With respect to energy supply, an independent power supply can be assigned to each of the two redundant subsystems. A system of this type can be considered as an overall electric load. The parallel subsystems can be considered as loads, or as subloads of the overall load.

The two process chains or subsystems can be implemented such that a symmetrical redundancy is achieved. For example, a steering system for highly automated driving (HAD) can comprise two subsystems, wherein each subsystem, with respect to the total available steering power, delivers one half of the steering power. Alternatively, both process chains or subsystems can be implemented such that an asymmetrical and/or cold redundancy is achieved. For example, in a braking system for HAD, in normal operation, a full system (by way of a first load or a first subload) can be employed and, in the event of a failure (by way of a second load or a second subload), an additional auxiliary system (which, in normal operation, is in standby mode) can assume the braking function. Typically, the auxiliary system is configured with a lower power rating than the full system.

The availability of a subsystem in a fault-tolerant system is also directly dependent, inter alia, upon the probability of failure of the associated supply unit. This is particularly important in a system with asymmetrical redundancy, as the failure of the subsystem with the higher performance rating (i.e. the first subload) entails a significant impairment of the performance capability of the system.

Accordingly, in order to reduce the probability of failure, the energy supply to the high-performance subsystem (i.e. the first subload) can itself be configured with redundancy.

In order to achieve a fault-tolerant system with single failure tolerance, whilst maintaining a facility for arbitration (i.e. using a "2003" or "two out of three" architecture having 3-fold redundancy), it would therefore be necessary for at least three independent supply units to be employed.

The present document addresses the technical object of the provision of an efficient energy supply, with respect to availability for a fault-tolerant overall load (preferably with asymmetrical redundancy) in a vehicle.

This object is fulfilled by the claimed invention.

According to one aspect, an energy supply device for an overall electric load and/or for a first electric load is described. The overall load and/or the first load are respectively designed to assume a specific function, particularly for the driving operation of a (motor) vehicle. Exemplary functions are the steering of the vehicle and/or the braking of the vehicle. For example, the overall load and/or the first load can be an element of an x-by-wire system. The overall load and/or the first load can be certified and/or rated in accordance with a specific ASIL level.

The overall load can comprise the first load (also described in the present document as the first subload) and preferably at least one redundant second load (also described in the present document as the second subload). The overall load can feature asymmetrical redundancy. In particular, the performance capability and/or the (electric) power take-up of the first subload can be greater than the performance capability and/or the (electric) power take-up of the second subload (e.g. by a factor of 1.5 or more, or by a factor of 2 or more).

The device comprises a first supply unit or energy source (e.g. an (optionally electrochemical) energy store, a generator and/or a DC voltage converter), which can be connected to the first load via a first switch element (of the device). The first supply unit can be an element of a first subnetwork of an electric power supply network of a vehicle. The first switch element can comprise at least one semiconductor-based switch, particularly a metal-oxide-semiconductor field-effect transistor, and/or a relay.

The device further comprises a second supply unit or energy source (e.g. an (optionally electrochemical) energy store, a generator and/or a DC voltage converter), which can be connected to the first load via a second switch element (of the device) and via one or more electric delimitation elements (of the device). The second supply unit can be an element of a second subnetwork of the electric power supply network (e.g. the on-board electric network) of a vehicle. The second load of the overall load can be connected to the second electric energy supply unit and/or supplied with electric energy from the second electric energy supply unit. The second switch element can comprise at least a semiconductor-based switch, particularly a metal-oxide-semiconductor field-effect transistor, and/or a relay.

The one or more electric delimitation elements (e.g. one or more passive electric elements) can comprise an ohmic resistor, which is designed to limit electric current from the second supply unit to the first supply unit. The resistor can assume a sufficiently high rating, in order to achieve the significant limitation of electric current. Alternatively, the resistor can assume a sufficiently low rating, in order to ensure that the proportion of the second supply voltage delivered by the second supply unit, and which is present across the first load when the second switch element is closed, permits the reliable minimum operation of the first subload.

Alternatively or additionally, the one or more electric delimitation elements can comprise an electric filter circuit, which is designed to at least partially damp any transmission of conducted interference from the first supply unit to the second supply unit and/or vice versa.

By way of the one or more delimitation elements, a limitation of the mutual influence of the first and second supply units can thus be achieved (particularly where parasitic signals can be propagated from one supply unit to the other, and can thus be classified as a common cause initiator for the simultaneous failure of all the loads or subloads of an overall load, within the meaning of ISO 26262).

The device further comprises a third switch element, which is designed to bridge the one or more electric delimitation elements. The third switch element can comprise at least one semiconductor-based switch, particularly a metal-oxide-semiconductor field-effect transistor, and/or a relay.

The device further comprises a (hardware- and/or software-based) control unit. Advantageously, the control unit can be an element of the first subload, particularly an element of a control device of the first subload. In particular, requirements with respect to operational security can thus be fulfilled in an efficient manner.

The control unit can be designed such that, in normal operation, the first switch element is caused to close. The second and third switch elements can moreover be caused to open. In normal operation, an energy supply to the first subload can thus be delivered (optionally exclusively) by the first supply unit (and, optionally, not by the second supply unit).

The control unit can further be designed to detect that the first supply voltage on the first supply unit has reached or fallen below a voltage threshold value. The device can comprise at least one measuring unit (e.g. a voltmeter), which is designed to detect sensor data with respect to the first supply voltage. The control unit can be designed, on the basis of the sensor data, to detect that the first supply voltage on the first supply unit has reached or fallen below the voltage threshold value.

The voltage threshold value can be set such that, above the voltage threshold value, at least one logic circuit of the first subload functions correctly, if the first supply voltage exceeds the voltage threshold value. Secondly, the logic circuit of the first subload may optionally be compromised, if the first supply voltage undershoots the voltage threshold value. The first and/or second supply voltage can assume e.g. a rated value of 12 V. For the correct operation of the logic circuit of the first subload, optionally, a (first and/or second) supply voltage of 6 V may be required. In this example, the voltage threshold value can lie e.g. between 7 V and 9 V.

The first load can be designed, prior to the achievement of the voltage threshold value, to execute a power downrating. In particular, optionally by degrees as the first supply voltage decreases, the electric power take-up (and, in consequence, the performance capability) of the first subload can be reduced. A power-related power downrating of the first subload can contribute to the stabilization of the first supply voltage (prior to the achievement of the voltage threshold value).

The control unit of the device can be designed, in response to detection to the effect that the first supply voltage has reached or fallen below the voltage threshold value, firstly to cause the second switch element to be closed. In consequence, the first load can be connected both (directly) to the first supply unit, and (indirectly, via the one or more delimitation elements) to the second supply unit. Accordingly, an uninterrupted transition of the supply of energy to the first subload from the first supply unit to the second supply unit can be executed.

Moreover, the first switch element can be caused to open thereafter. In consequence, the first load (indirectly, via the one or more delimitation elements) can be connected to the second supply unit (and can no longer be connected to the first supply unit).

Moreover, the third switch element can be caused to close thereafter, such that the first load is (directly) connected to the second supply unit. By the closing of the third switch element, in particular, it can be caused that the one or more delimitation elements are bridged, such that the full supply of energy to the first subload from the second electric power supply is permitted.

Overall, by way of the energy supply device described in the present document, an energy supply to an (overall) load in a vehicle, which is fault-tolerant with respect to energy supply, is permitted. A fault-tolerant function can thus be executed, with no doubling of the number of subloads.

The control unit can be designed to check whether or not the second supply voltage on the second supply unit exceeds the voltage threshold value and/or exceeds a second voltage threshold value (wherein the second voltage threshold value can be equal to or greater than the voltage threshold value). In this case (and, optionally, only in this case), the first load (by the closing of the second switch element) can be caused to be connected to the second supply unit, if it has been determined that the second supply voltage exceeds the (optionally, second) voltage threshold value. Optionally, a switchover to the second supply unit can thus only be executed if it is established that the second supply unit permits a reliable supply of energy to the first subload. The reliability of the energy supply to the first subload can thus be further improved.

As described above, the first supply unit can be an element of a first subnetwork, and the second supply unit can be an element of a second subnetwork in an overall energy supply network. The first subnetwork and the second subnetwork, by way of a coupling circuit element (e.g. by way of a semiconductor-based switch), can be mutually connectable (in order to permit the exchange of energy between the two subnetworks).

The control unit can be designed to check whether the coupling circuit element (which mutually connects or mutually isolates the first subnetwork and the second subnetwork) is open. In this case (and, optionally, only in this case), it can be caused that the first load (by the closing of the second switch element) is connected to the second supply unit, if it has been established that the coupling circuit element is open. Thus, in a reliable manner, spurious and/or non-target-oriented switchovers of the energy supply of the first subload to the second supply unit can be prevented (e.g. where the coupling circuit element is still closed), as a result of which the reliability of the energy supply to the first subload is further improved.

The second switch element can comprise a first node point (e.g. a first port, for example the source of a transistor), which is (directly) connected to the second supply unit, and a second node point (e.g. a second port, for example the drain of a transistor), which is (directly) connected to the one or more electric delimitation elements. Moreover, the first load can be (directly) connected to a point which is described as the supply point.

The third switch element can be configured to (directly) connect the second node point of the second switch element to the supply point (in order to bridge the one or more delimitation elements). Alternatively, the third switch element can be configured to (directly) connect the first node point of the second switch element to the supply point (in order to bridge the series-connected arrangement of the one or more delimitation elements and the second switch element). By way of the last-mentioned variant, a supply of energy from the second supply unit can be delivered, without current limitation.

The overall load can comprise a (further) redundant third load (also described in the present document as the third subload), which is connected to the first supply unit and, optionally, via the switchover device (e.g. the second and/or third switch element) to the second energy supply. Thus, for example, a 2oo3 fault-tolerant overall load can be provided with only two energy supplies.

According to a further aspect, an electric power supply network for a vehicle is described, which comprises the overall load and the energy supply device which is described in the present document. The power supply network can be a low-voltage supply network, having a rated voltage of 60 V or lower, particularly having a rated voltage of 48 V or 12 V.

According to a further aspect, a (road) motor vehicle (particularly a passenger motor vehicle or a heavy goods motor vehicle, a bus or a motorcycle) is described, which comprises the energy supply device described in the present document and/or the power supply network described in the present document.

According to a further aspect, a method for the supply of energy to an overall electric load which, for the execution of a function, comprises a first subload (i.e. a first load) is described. Alternatively, the method can be configured for the supply of energy to a first subload (i.e. a first load). According to the method, in normal operation, a first switch element is caused to be closed, such that the first subload, via the closed first switch element, is connected to a first (electric) supply unit. The method also comprises detection to the effect that a first supply voltage on the first supply unit has reached or fallen below a voltage threshold value. According to the method, in response thereto, a second switch element is further caused to be closed, such that the first subload, via one or more electric delimitation elements (e.g. via one or more passive electric elements) and via the closed second switch element, is connected to a second (electric) supply unit. Moreover, according to the method, the first switch element is caused to be opened thereafter, in order to disconnect the first subload from the first supply unit, and a third switch element is caused to be closed thereafter, in order to bridge the one or more electric delimitation elements.

It should be observed that the methods, devices and systems described in the present document can be employed either in isolation, or in combination with other methods, devices and systems described in the present document. Moreover, any aspects of the methods, devices and systems described in the present document can be mutually combined in a variety of ways. In particular, the features of the claims can be mutually combined in a variety of ways.

The invention is described in greater detail hereinafter, with reference to exemplary embodiments.

DETAILED DESCRIPTION OF THE DRAWINGS

Figure 1:
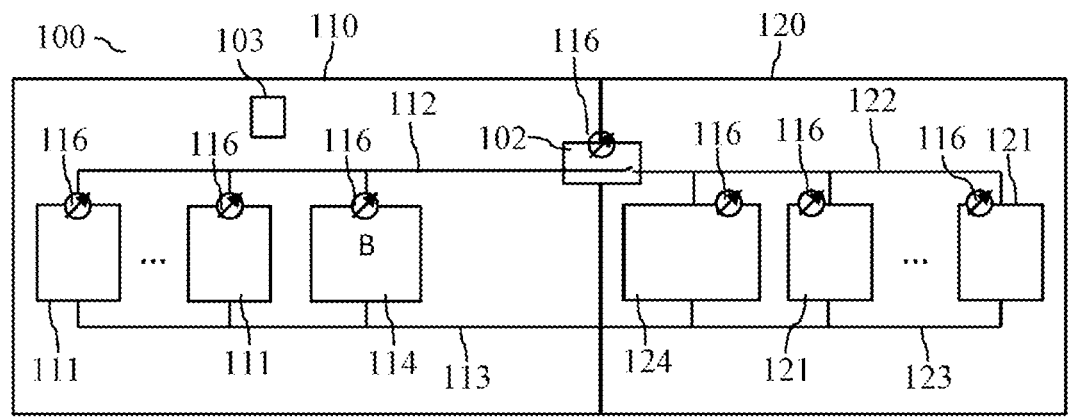
FIG. 1 shows an exemplary power supply network of a vehicle.

As described above, the present document addresses the efficient supply of energy to the subloads of a safety-related overall load in a vehicle. In this connection, FIG. 1 shows an electric power supply network 100 having two subnetworks 110, 120. In the first subnetwork 110, one or more first electric loads 111 are arranged. The one or more first electric loads 111 can be certified and/or rated to a specific ASIL level and/or can fulfill a specific ASIL level with respect to the availability of the energy supply. The one or more first electric loads 111 can respectively incorporate one or more measuring units 116, which are designed to measure current and/or voltage on the respective load 111. On the basis of the current and/or voltage measurement, a direct monitoring of potential faults on the respective electric load 111 and/or on the associated electric lines and/or contacts can be executed (e.g. by way of a control unit 103). The one or more electric loads 111, for the supply of energy, can be (galvanically) connected to a first supply line 112 and to a reference potential 113 (e.g. ground).

The second subnetwork 120 comprises one or more second loads 121, which are supplied with electric energy via a second supply line 122 and a terminal connection to the reference potential 123 (e.g. ground). The reference potentials 113, 123 of the two subnetworks 110, 120 can be directly galvanically connected to each other. The one or more second loads 121 on the second subnetwork 120 can be certified and/or rated to a specific ASIL level and/or can fulfill a specific ASIL level with respect to the availability of the energy supply. The one or more second electric loads 121 can respectively incorporate one or more measuring units 116, which are designed to measure current and/or voltage on the respective load 111.

The two subnetworks 110, 120 can be mutually connected by way of a coupling circuit element 102. The circuit element 102, as required (e.g. in the event of a fault on one of the two subnetworks 110, 120), can be opened, in order to mutually disconnect the second subnetwork 120 and the first subnetwork 110. By the separation of the second subnetwork 120 from the first subnetwork 110, it can be achieved that the first subnetwork 110 is not compromised by a fault on the second subnetwork 120 (and vice versa). The coupling circuit element 102, which comprises e.g. a semiconductor-based switch element, can be certified or rated in accordance with a specific ASIL level.

The first subnetwork 110 can incorporate a first supply unit 114 (e.g. a battery and/or a DC voltage converter). In a corresponding manner, the second subnetwork 120 can incorporate a second supply unit 124 (e.g. a battery and/or a DC voltage converter).

As described above, an electrical component (i.e. an overall electric load) for the delivery of a (typically safety-related) function can be divided into a number of subloads. By the employment of asymmetrical redundancy, the subloads can assume different performance capabilities. In particular, an overall electric load can comprise a first subload having a relatively high performance capability (particularly with respect to one or more capabilities of the subload), and a second subload having a relatively low performance capability. For the achievement of a higher functional performance capability, the first subload can be connected to two separate supply units 114, 124 or subnetworks 110, 120.

Figure 2A:
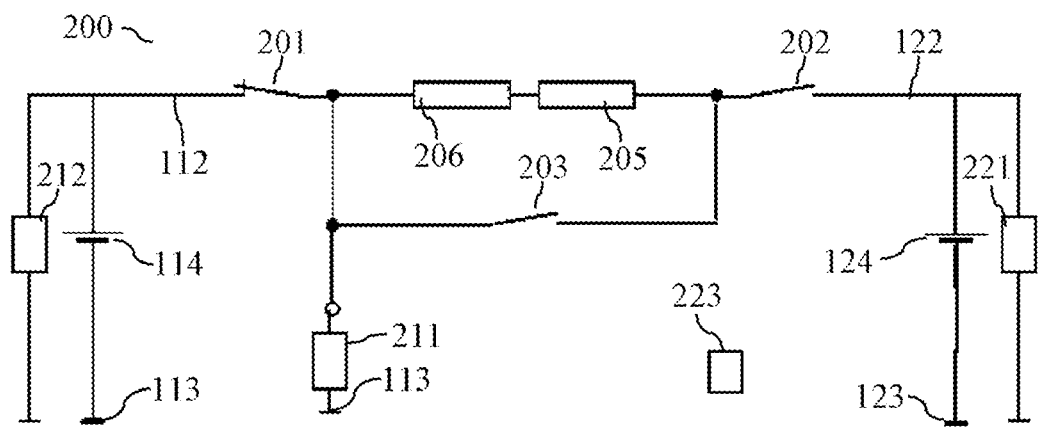
FIGS. 2a and 2b respectively show an exemplary device for the supply of energy to subloads of a safety-related overall electric load of a vehicle.
Figure 2B:
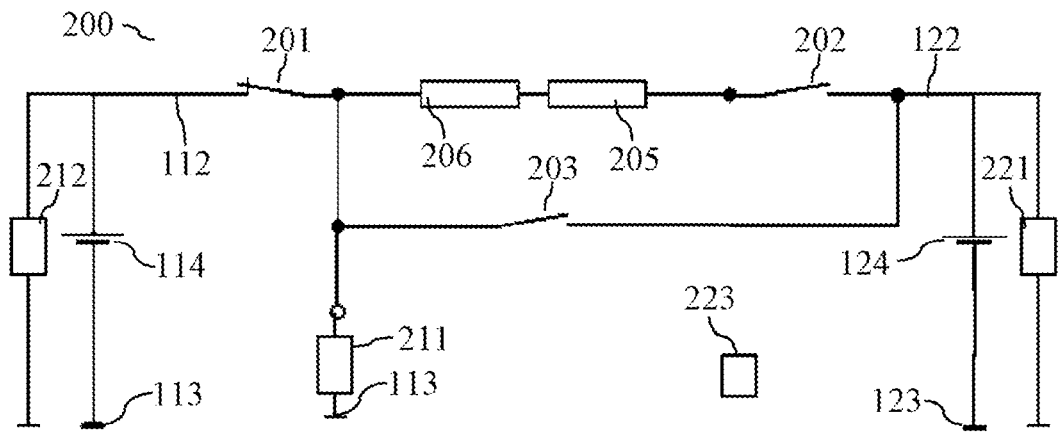

FIGS. 2*a* and 2*b* respectively show a device 200 for the supply of energy to the subloads 211, 221, 212 of a (fault-tolerant) overall load of a vehicle. The overall load can be constituted of two or three subloads 211, 221, 212, which are operated in parallel with one another. For example, the overall load can comprise a first subload 211 which, for the supply of energy, is connected via the switch element 201 to the first subnetwork 110, and is connectable to the second subnetwork 120 via the electric elements 206, 205 and the switch element 202, or via the switch element 203. The overall load can further comprise a second subload 221 which, for the supply of energy, is connected to the second subnetwork 120. Optionally, the overall load can moreover comprise a further subload 212, which can also be connected to the first subnetwork 110 and/or to the first supply unit 114. The first subload 211 can optionally assume a higher performance capability than the second and/or the further subload 221, 212. In particular, the first subload 211 can be configured such that, by way of the first subload 211, the overall function of the overall load can be delivered, whereas the second and/or the further subload 221, 212, optionally, deliver only a basic function or an emergency function respectively.

The first subload 211 can be connected via a first switch element 201 to the first supply unit 114. Moreover, the first subload 211 can be connectable via one or more electric filtering and/or delimitation elements 205, 206 and via a second switch element 202 to the second supply unit 124. Moreover, a third switch element 203 can be provided, in order to bridge the one or more filtering and/or delimitation elements 205, 206, and in order to permit the direct connection of the first subload 211 (bypassing the one or more filtering and/or delimitation elements 205, 206) to the second supply unit 124 and/or to the second subnetwork 120.

In normal operation, the first switch element 201 can be closed, and the second and third switch elements 202, 203 can be open, such that the first subload 211 (optionally, exclusively) is supplied with electric energy from the first supply unit 114 (and not from the second supply unit 124). If a fault is detected in the first subnetwork 110 and/or on the first supply unit 114 (e.g. on the basis of the sensor data from a measuring unit 116), the second switch element 202 can firstly be closed, in order to additionally supply electric energy from the second supply unit 124 to the first subload 211 via the one or more filtering and/or delimitation elements 205, 206. Subsequently, the first switch element 201 can be opened (in order to disconnect the defective first supply unit 114 and/or the defective first subnetwork 110) and, thereafter, the third switch element 203 can be closed (in order to bridge the one or more filtering and/or delimitation elements 205, 206, in the interests of an efficient supply of energy from the second supply unit 124). A redundant energy supply for a subload 211 of an overall load can thus be delivered in an efficient manner.

An energy supply device 200 for a first subload 211 is thus described, in which energy is supplied by way of two independent supply units 114, 124. In an asymmetrical 1oo2 system, the first subload 211 can be the subsystem of the two subsystems having the higher performance capability. This subsystem is connected to both subnetworks 110, 120, such that the subsystem with the higher performance capability, in the event of the failure of one of the two supply units 114, 124, will continue to be available. In a 2oo3 system, one subsystem can be connected to both energy supply units 114, 124, and the other two subsystems can be connected respectively to the first supply unit 114 or the second supply unit 124. In consequence, in the event of the failure of one energy supply, a 2oo2 system will still be in place.

In the interests of comprehensive energy system management in a vehicle, a specific allocation of components or loads 212, 211, 221 to supply units 114, 124 should always be in place. In particular, any toggle switching or alternating switching of a subload 211 between two different supply units 114, 124 should be avoided. Moreover, an uninterrupted switchover from one supply unit 114 to another supply unit 124 should be permitted, in order to prevent any resetting of a subload 211 associated with a short-term undervoltage. Moreover, any temporary low-resistance coupling of the subnetworks 110, 120 or of the different supply units 114, 124 should also be excluded, in order to prevent any power spikes in the switch elements 201/202 and/or any transient loading of the supply units 114, 124.

A switchover from the primary supply unit 114 to the secondary supply unit 124, which fulfills the above-mentioned requirements, is ensured by the circuit 200 which is represented in FIGS. 2*a* and 2*b*. A resistor R 205 can be employed, which limits a crossover current Iq between the subnetworks 110, 120 to a permissible value. The resistor 205 can be rated such that at least the energy supply for the logic component of the control device of the first subload 211 which is connected to the overall supply system via the second supply unit 124, with the second switch element 202 closed and the switch elements 201, 203 open, is delivered. Moreover, an impedance X 206 can be provided in the form of a filter circuit. A filter circuit can be employed in order to reduce and/or suppress the transmission of conducted interference from one subnetwork 110 to the other subnetwork 120.

The energy supply device 200 can be operated as follows.

In an initial state, the first switch element 201 is closed, and the supply of energy to the subload 211 is executed by way of the first supply unit 114.

A fault in the first subnetwork 110 can lead to a reduction in the first supply voltage on the first supply unit 114. The subload 211 on the overall supply system can execute a voltage-related power downrating, immediately the first supply voltage falls below a first voltage threshold value. In other words, the power and/or current take-up of the subload 211 can be reduced (in a voltage-dependent manner).

If the first supply voltage, notwithstanding the downrating, continues to fall, and falls below a second voltage threshold value, a switchover to the second subnetwork 120 can be executed. The second voltage threshold value can be set such that, owing to the power downrating, only the logic component, including the communication function, of the subload 211 continues to be active, and the power component of the subload 211 assumes no further function, or virtually no further function.

For the execution of a switchover, firstly, the second switch element 202 can be closed, in order to ensure the continuing stable operation of the logic circuit of the subload 211 by way of the second supply unit 124. Typically, the second switch element 202 is only closed if the second supply voltage on the second supply unit 202 is greater than the first supply voltage on the first supply unit 201 and/or if the second supply voltage lies within a permissible operating voltage supply range for the subload 211.

In a further step, the first switch element 201 is opened, in order to disconnect the subload 211 and the second subnetwork 120 or the second supply unit 124 from the first supply unit 114. Finally, the third switch element 203 can be closed. In consequence, the full second supply voltage of the second supply unit 124 is present on the subload 211, and the power downrating of the power component of the subload 211 can be reversed. The controlled switchover is then complete.

As represented in FIG. 2a, the third switch element 203 can be designed to bridge the one or more delimitation elements 205, 206, but not the second switch element 202. Alternatively, the third switch element 203 can be designed, as represented in FIG. 2b, to bridge the one or more delimitation elements 205, 206 and the second switch element 202. By way of the second variant, operational security with respect to contingent hardware defects on an individual switch element 202, 203 can be further enhanced. Moreover, the terminal voltage on the subload 211 can be increased, by the omission of an internal switch resistance. The switch elements 202 and 203 can thus be connected in parallel or in series.

The parallel circuit (as represented in FIG. 2b) is advantageous, in terms of a low-impedance supply. The series circuit (as represented in FIG. 2a) can be advantageous for reasons of operational security, if any defective connection of the supply lines 122 and 112 is to be securely prevented.

Control of the temporal sequence of settings of the switch elements 201, 202, 203 can be implemented in the hardware of a separate device 103 and/or by way of a logic circuit, which is implemented in the control device 223 of the subload 211.

Optionally (as described in conjunction with FIG. 1), it is possible for the two supply units 114, 124 not to be mutually independent, wherein the supply units 114, 124 are mutually connected via the power supply network 100 of the vehicle by way of a coupling circuit element 102, which coupling circuit element 102 can be controlled by a superordinate energy management system. In this case, voltages on the two supply units 114, 124 can be evaluated at the time of any switchover, in order to prevent any spurious switch-on or switch-off of a supply unit 114, 124. Where the coupling circuit element 102 is closed, the two supply voltages will collapse simultaneously in the event of a supply network fault. Only once the supply network 100 has opened the coupling circuit element 102 will it be possible to reliably identify the fault-free subnetwork, by reference to the voltage difference between the first and the second supply voltage and/or by the evaluation of the absolute values for the supply voltage which is present on the terminals of one or more subloads 211, 212, 221. It can then be decided whether or not a switchover from the first supply unit 114 to the second supply unit 124 is necessary. This can be executed e.g. in a central control unit 103, or independently thereof in a control device 223 (e.g. within the load 211). In particular, a check can be executed as to whether the minimum required voltage threshold on the present supply path of the first subload 211 has been undershot.

If this is the case, a switchover can be executed to the second supply unit 124 (also described in the present document as an energy source).

Figure 3:
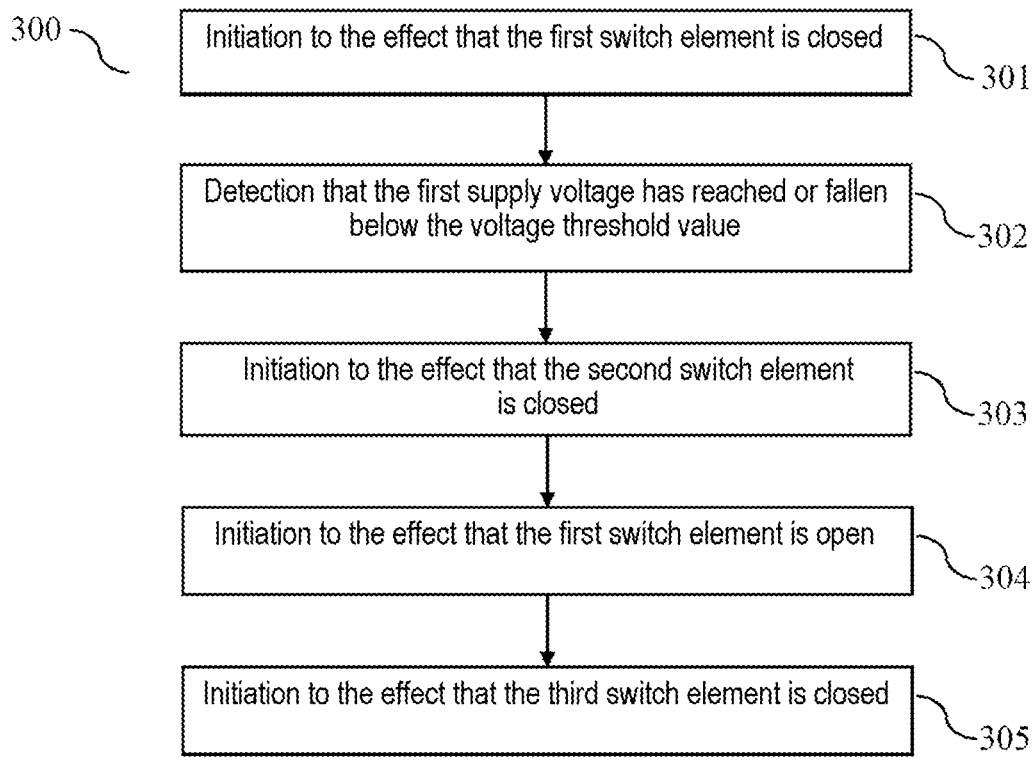
FIG. 3 shows a flow diagram of an exemplary method for the supply of electric energy to a subload of a safety-related overall electric load.

FIG. 3 shows a flow diagram of an exemplary method 300 for the supply of energy to an overall electric load which, for the delivery of a function (e.g. a braking or steering function), comprises a first subload 211 and at least one redundant second subload 221. The overall load can feature asymmetrical redundancy, wherein the first subload 211 can optionally assume a higher performance capability, with respect to the function to be delivered, than the second subload 221. The method 300 can be executed in a software- and/or hardware-based manner.

The method 300 comprises initiation 301 to the effect that, in normal operation, a first switch element 201 is closed, such that the first subload 211 is connected, via the closed first switch element 201, to a first supply unit 114. The method 300 further comprises detection 302 to the effect that a first supply voltage on the first supply unit 114 has reached or fallen below a voltage threshold value. The voltage threshold value can be set such that, below the voltage threshold value, the function of the first subload 211 can no longer be delivered (or at least can only be partially delivered).

The method 300 further comprises, in response to the detection step 302, initiation 303 to the effect that a second switch element 202 is closed, such that the first subload 211, via one or more electric delimitation elements (e.g. one or more passive electric elements) 205, 206, and via the closed second switch element 202, is connected to a second supply unit 124. The second subload 221, under standard conditions, can optionally be connected to the second supply unit 124. The first subload 211 can thus be temporarily connected both to the first supply unit 114 (via the closed first switch element 201) and to the second supply unit 124 (via the closed second switch element 202). By way of the one or more delimitation elements 205, 206, a limitation of the impacts of the second supply unit 124 upon the first supply unit 114 (or vice versa) can be achieved. A reliable energy supply can thus be delivered (without interruption).

The method 300 further comprises subsequent initiation 304 to the effect that the first switch element 201 is opened, in order to disconnect the first subload 211 from the first supply unit 114. The method 300 moreover comprises subsequent initiation 305 to the effect that a third switch element 203 is closed, in order to bridge the one or more electric delimitation elements 205, 206. In consequence, the first subload 211 is supplied directly with electric energy from the second supply unit 124, in a low-impedance arrangement. Overall, by way of the method 300, a reliable and redundant energy supply for a subload 211 of an overall electric load can be delivered in an efficient manner (e.g. in a 1oo2 or 2oo3 redundancy arrangement).

The present invention is not limited to the exemplary embodiments represented. In particular, it should be observed that the description and the figures are only intended to illustrate the principle of the methods, devices and systems proposed.

What is claimed is:

1. An electric power supply network comprising:
  an overall load comprising a first load and a second load; and
  an energy supply device for supplying energy to the overall load, the energy supply device comprising:
    a first switch element;
    a first supply unit, which is connectable to the first load via the first switch element;
    a second switch element;
    one or more electric delimitation elements;
    a second supply unit, which is connectable to the first load via the second switch element and via the one or more electric delimitation elements; and
    a third switch element which is configured to bridge the one or more electric delimitation elements; and
    a control unit which is configured:
      such that, in normal operation, the first switch element is caused to close, and the second and third switch elements are caused to open;

to detect that a first supply voltage on the first supply unit has reached or fallen below a voltage threshold value; and in response to the detection, firstly to cause the second switch element to close, thereafter to cause the first switch element to open, and thereafter to cause the third switch element to close, such that the first load is connected to the second supply unit, wherein:

the voltage threshold value is set such that a logic circuit of the first load functions correctly when the first supply voltage exceeds the voltage threshold value, the voltage threshold value is less than a rated value of the first supply voltage, the second load is connected to the second supply unit, the overall load has an asymmetrical redundancy, the first load is configured for delivery of a first function, the second load is configured for delivery a second function that is different from the first function, and at least one of a functional performance capability or a power take-up of the first load is greater than at least one of a functional performance capability or a power take-up of the second load.

2. The energy supply device according to claim 1, wherein the control unit is further configured:

to check whether a second supply voltage on the second supply unit exceeds a second voltage threshold value; and to cause the first load to be connected to the second supply unit, if it has been determined that the second supply voltage exceeds the second voltage threshold value.

3. The energy supply device according to claim 1, wherein:

the first supply unit is an element of a first subnetwork, and the second supply unit is an element of a second subnetwork in an overall power supply network;

the first subnetwork and the second subnetwork are connectable by way of a coupling circuit element; and the control unit is further configured:

to check whether the coupling circuit element is open; and to cause the first load to be connected to the second supply unit, if it has been determined that the coupling circuit element is open.

4. The energy supply device according to claim 1, wherein the one or more electric delimitation elements comprise an electrical resistor, which is configured to limit electric current from the second supply unit to the first supply unit.

5. The energy supply device according to claim 1, wherein the one or more electric delimitation elements comprise an electric filter circuit, which is configured to at least partially damp any transmission of conducted interference from the first supply unit to the second supply unit, and/or from the second supply unit to the first supply unit.

6. The energy supply device according to claim 1, wherein:

the second switch element comprises a first node point, which is connected to the second supply unit, and a second node point, which is connected to the one or more electric delimitation elements;

the first load is connected to a supply point;

the third switch element is configured to connect the second node point of the second switch element to the supply point; or the third switch element is configured to connect the first node point of the second switch element to the supply point.

7. The energy supply device according to claim 1, wherein the overall load comprises a redundant third load which is connected to the first supply unit.

8. The energy supply device according to claim 1, wherein at least one of the first switch element, the second switch element, or the third switch element comprises at least one semiconductor-based switch.

9. The energy supply device according to claim 8, wherein the at least one semiconductor-based switch comprises at least one of a metal-oxide-semiconductor field-effect transistor or a relay.

10. The energy supply device according to claim 1, wherein the first load is configured, prior to an achievement of the voltage threshold value, to execute a power downrating.

11. The energy supply device according to claim 1, wherein at least one of:

the control unit is an element of the first load; or the control unit is an element of a control device of the first load.

12. The energy supply device according to claim 1, further comprising at least one measuring unit, which is designed to detect sensor data with respect to the first supply voltage, wherein the control unit is further configured based on the sensor data, to detect that the first supply voltage on the first supply unit has reached or fallen below the voltage threshold value.

13. A method for supplying energy to an overall load, which comprises a first load and a second load, the method comprising:

in normal operation, causing a first switch element to close such that the first load is connected, via the closed first switch element, to a first supply unit;

detecting that a first supply voltage on the first supply unit has reached or fallen below a voltage threshold value;

in response to the detecting, causing a second switch element to close such that the first load, via one or more electric delimitation elements, and via the closed second switch element, is connected to a second supply unit;

subsequently causing the first switch element to open in order to disconnect the first load from the first supply unit; and subsequently causing a third switch element to close in order to bridge the one or more electric delimitation elements, wherein:

the voltage threshold value is set such that a logic circuit of the first load functions correctly when the first supply voltage exceeds the voltage threshold value, the voltage threshold value is less than a rated value of the first supply voltage, the overall load further comprises a second load that is connected to the second supply unit, the overall load has an asymmetrical redundancy, the first load is configured for delivery of a first function, the second load is configured for delivery of a second function that is different from the first function, and at least one of a functional performance capability or a power take-up of the first load is greater than at least one of a functional performance capability or a power take-up of the second load.

* * * * *